United States Patent
Van Dijk et al.

(10) Patent No.: US 10,858,454 B2
(45) Date of Patent: Dec. 8, 2020

(54) RUBBER EXTRACTION METHOD

(71) Applicant: Lion-Flex B.V., Nijmegen (NL)

(72) Inventors: Peter Johannes Van Dijk, Wageningen (NL); Rolf André Mank, Wageningen (NL)

(73) Assignee: LION-FLEX B.V., Nijmegan (NL)

(*) Notice: Subject to any disclaimer, the term of this patent is extended or adjusted under 35 U.S.C. 154(b) by 62 days.

(21) Appl. No.: 15/773,024

(22) PCT Filed: Nov. 3, 2016

(86) PCT No.: PCT/NL2016/050763
§ 371 (c)(1),
(2) Date: May 2, 2018

(87) PCT Pub. No.: WO2017/078522
PCT Pub. Date: May 11, 2017

(65) Prior Publication Data
US 2018/0319904 A1    Nov. 8, 2018

(30) Foreign Application Priority Data

Nov. 3, 2015    (NL) ..................... 2015711

(51) Int. Cl.
| | | |
|---|---|---|
| *C08C 1/04* | (2006.01) | |
| *C08C 1/14* | (2006.01) | |
| *C08C 2/00* | (2006.01) | |
| *C08L 7/00* | (2006.01) | |
| *C08L 9/00* | (2006.01) | |
| *C08C 1/02* | (2006.01) | |
| *C08C 4/00* | (2006.01) | |
| *B60C 1/00* | (2006.01) | |

(52) U.S. Cl.
CPC ............. *C08C 1/04* (2013.01); *C08C 1/02* (2013.01); *C08C 1/14* (2013.01); *C08C 2/00* (2013.01); *C08C 4/00* (2013.01); *C08L 7/00* (2013.01); *C08L 9/00* (2013.01); *B60C 1/00* (2013.01)

(58) Field of Classification Search
CPC .... C08C 1/04; C08C 1/14; C08C 2/00; C08C 4/00
See application file for complete search history.

(56) References Cited

U.S. PATENT DOCUMENTS

| | | |
|---|---|---|
| 140,282 A | 6/1873 | Lamb |
| 2,408,853 A | 10/1946 | Hoover |
| 2,440,554 A | 4/1948 | Naghski et al. |
| 4,526,959 A | 7/1985 | Kay et al. |
| 4,681,929 A | 7/1987 | Cole et al. |
| 4,684,715 A * | 8/1987 | Kay .......................... C09F 1/00 528/491 |
| 7,540,438 B2 * | 6/2009 | Buranov ................... C08C 3/00 241/19 |
| 2006/0106183 A1 | 5/2006 | Cornish et al. |
| 2006/0225144 A1 * | 10/2006 | Hallahan .............. C12N 9/1085 800/278 |
| 2007/0276112 A1 | 11/2007 | Buranov |
| 2011/0275142 A1 * | 11/2011 | Wade .................. C08B 37/0003 435/274 |
| 2015/0126673 A1 | 5/2015 | Randall et al. |
| 2018/0271043 A1 * | 9/2018 | Van Dijk ................ A01H 5/02 |

FOREIGN PATENT DOCUMENTS

| | | |
|---|---|---|
| EP | 2 868 697 A1 | 5/2015 |
| EP | 2 883 909 A1 | 6/2015 |
| GB | 2 098 222 A | 11/1982 |
| SU | 56448 A1 | 12/1940 |

OTHER PUBLICATIONS

Joseph Naghski et al., "Anaerobic Fermentation of Cryptostegia Leaves for Recovery of Rubber," 49 Journal of Bacteriology 563 (1945).*
Sam R. Hoover et al., "Cryptostegia Leaf Rubber," 37 Industrial and Engineering Chemistry 803 (1945).*
Anvar U. Buranov & Burkhon J. Elmuradov, "Extraction and Characterization of Latex and Natural Rubber from Rubber-Bearing Plants," 58 Journal of Agricultural and Food Chemistry 734 (2010).*
C.L. Swanson et al., "Molecular Weight of Natural Rubbers from Selected Temperate Zone Plants," 23 Journal of Applied Polymer Science 743 (1979).*
H. Mooibroek & K. Cornish, "Alternative Sources of Natural Rubber," 53 Applied Microbiology Biotechnology 355 (2000).*
Porntip Rojruthai et al., "In vitro Synthesis of High Molecular Weight Rubber by Hevea Small Rubber Particles," 109 Journal of Bioscience and Bioengineering 107 (2010).*
International Search Report issued in International Patent Application No. PCT/NL2016/050763, dated Mar. 30, 2017.

* cited by examiner

*Primary Examiner* — Nicholas E Hill
(74) *Attorney, Agent, or Firm* — Foley & Lardner LLP; Sunit Talapatra

(57) ABSTRACT

The present invention relates to a method for obtaining rubber from rubber-containing plant material, the method comprising the steps of subjecting a composition comprising rubber-containing plant material and a fermentation culture to conditions allowing anaerobic fermentation, wherein the composition preferably has a water content of less than 95 wt. %. The fermentation preferably does not involve movement of the rubber-containing plant material (or parts thereof), and preferably the fermentation is performed in the absence of oxygen ventilation. Additionally, it is preferred that the fermentation culture is cycled through the composition by percolation. A further step of the method involves obtaining the rubber from the composition.

17 Claims, No Drawings

RUBBER EXTRACTION METHOD

CROSS-REFERENCE TO RELATED APPLICATIONS

This application is the National Phase of International Patent Application No. PCT/NL2016/050763, filed Nov. 3, 2016, published on May 11, 2017 as WO 2017/078522 A1, which claims priority to Netherlands Patent Application No. 2015711, filed Nov. 3, 2015. The contents of these applications are herein incorporated by reference in their entirety.

TECHNICAL FIELD

The present invention relates to a specific method for obtaining rubber from rubber-containing plant material.

BACKGROUND OF THE INVENTION

Prior art methods for harvesting rubber from plants are characterized by drawbacks in that they are cumbersome, water and energy consuming, lead to inferior rubber quality, and/or cannot be up scaled.

For instance, Eskew (Rubber Chemistry and Technology 19(3), 856-864, 1946) discloses an elaborate rubber-recovery process comprising several water- and energy-consuming steps including leaching in hot water, pebble milling in water, elimination of solids, flotation, washing on vibration screens, and centrifugation.

Likewise, US2007/0276112 discloses a process of recovering rubber from rubber-bearing plants that involves mechanical extraction, which negatively affects the rubber molecular weight, and thus the rubber quality.

SU56448 A1 discloses a method of obtaining natural rubber from rubber plants by wet fermentation of cellulose tissue and other inlaying substances with the aid of bacteria. This method however is highly water consuming, particularly when up scaled, and thus environmentally unfriendly.

Furthermore, U.S. Pat. No. 140,282 discloses a method for extracting caoutchouc from plants by fermentation in ventilated tanks, and U.S. Pat. No. 1,918,671 discloses a method for extraction of rubber by a retting and coagulation treatment. These methods also leave room for improvement, e.g. in rubber yield and rubber quality.

It is an objective of the present invention to provide a simple method for rubber extraction that overcomes at least the above disadvantages. It is also an objective of the present invention to provide a method for rubber extraction that allows efficient extraction, independent of the rubber content of the input material.

General Definitions

In the following description and examples, a number of terms are used. In order to provide a clear and consistent understanding of the specification and claims, including the scope to be given such terms, the following definitions are provided. Unless otherwise defined herein, all technical and scientific terms used have the same meaning as commonly understood by one of ordinary skill in the art to which this invention belongs.

As used herein, the term "anaerobic fermentation" or "dry fermentation" or "conditions allowing anaerobic fermentation" refers to anaerobic fermentation which preferably does not involve or require stirring, movement or mixing of the input material/organic matter (nor of parts thereof), nor the addition of liquid, such as water, (with the exception of the addition of the fermentation culture). The low requirement of water is a major advantage.

In other words, the (organic) input may remain stationary throughout the process, thus not requiring moving parts and resulting in low system maintenance and repair costs. This also implies that the process may be a closed loop liquid cycle process, meaning that liquid may be cycled (in particular liquid comprising or being the fermentation culture), but that no additional liquid may be required following start-up, and thus eliminating post-process waste water treatment needs. Further, in certain cases no pre-treatment of the input material is required. Another advantage is that by-products such as (bio)gas may be captured easily. In general, input material, i.e. rubber-containing plant material, may be used which has a moisture (i.e. water) content of e.g. less than 99, 98 or 95 wt. %, preferably less than 90, 89.5, 89, 88.5, 88, 87.5, 87, 86.5, 86, 85.5, 85, 84.5, 84, 83.5, 83, 82.5, 82, 81.5, 81, 80.5, 80, 75, 70, 65, 60, 55, 50 wt. % with respect to the (fresh) weight of the input material. Alternatively, the composition as a whole, i.e. comprising the input material and the fermentation culture, may have a moisture (i.e. water) content of e.g. less than 99, 98 or 95 wt. %, preferably less than 90, 89.5, 89, 88.5, 88, 87.5, 87, 86.5, 86, 85.5, 85, 84.5, 84, 83.5, 83, 82.5, 82, 81.5, 81, 80.5, 80, 75, 70, 65, 60, 55, 50 wt. % with respect to the (fresh) weight of the composition. Preferably, the conditions allowing anaerobic (dry) fermentation are such that no air and/or gas (mixture) containing more than 15 vol. % oxygen is present, preferably no air containing more than 10, 5, 4, 3, 2, 1, or 0.1 vol. % oxygen is present. This can be achieved for example by replacing oxygen with nitrogen or more preferably with carbon dioxide. Additionally or alternatively, the conditions allowing anaerobic fermentation are such that the anaerobic (dry) fermentation is performed in the absence of oxygen ventilation. The term fermentation is often used interchangeably with anaerobic digestion when describing the decomposition of organic material (typically when discussing foods and beverages). In this regard, fermentation can be seen as a metabolic process that converts sugar to acids, gases and/or alcohol. Sugars are the most common substrate of fermentation, and typical examples of fermentation products are ethanol, lactic acid, carbon dioxide, and hydrogen gas. However, also other compounds can be produced by fermentation, such as butyric acid and acetone. Also other compounds may be digested like inulin, cellulose, ligin, etc. In the case of lignin it is preferred to add lignase enzyme prior to the fermentation step. More specifically, fermentation is a distinct biological reaction that makes up one step in the more-encompassing process of anaerobic digestion. It is amongst others responsible for acidogenesis, the forming of acids. Anaerobic fermentation is a metabolic pathway for certain microbial organisms in anoxic environments, i.e, environments with reduced, strongly reduced or absent oxygen levels. During fermentation, larger organic molecules, for instance sugars, are converted into a mixture of reduced end products (products that have gained electrons). The process occurs in two steps. First, energy (in the form of ATP molecules) is produced by the reactions of glycolysis, a process that breaks down sugars and converts them into pyruvate molecules. NAD+ molecules are used up in this step and are transformed into NADH. In the second step, NAD+ is recreated from NADH via oxidation and reduction reactions (which involve repositioning electrons). NADH molecules donate an electron to an acceptor. Because a typical substance that normally receives the electron, like oxygen, is not available, endogenous electron acceptors are utilized in this cycle. Pyruvate molecules, (created during glycolysis) accept the electron and are subsequently converted into substances such as acids and alcohols through further molecular rearrangement. Specific fermentation reactions differ according to the microorganism performing the process as well as the original substrates (for instance sugars) being used. The result is the creation of varying end products. In the case of fermentation within anaerobic digestion, the production of a mixture of organic acids may drive the decomposition process to create biogas. The fermentation according to the present disclosure may typically be conducted at a temperature of 20-45 degrees Celsius, preferably 35-42 degrees Celsius.

As used herein, the term "plant" or "plant material" includes plant cells, plant tissues or organs, plant protoplasts, plant cell tissue cultures from which plants can be regenerated, plant calli, plant cell clumps, and plant cells that are intact in plants, or parts of plants, such as embryos, pollen, ovules, fruit (e.g. harvested fruit), flowers, leaves, seeds, roots, root tips and the like.

As used herein "*Taraxacum*" refers to the genus of flowering plants in the family Asteraceae and consists of species commonly known as dandelion. *Taraxacum officinale*, the common dandelion, is a flowering herbaceous perennial plant of the family. *Taraxacum koksaghyz*, commonly referred to as the Kazakh dandelion or Russian dandelion, is a species of dandelion native to Kazakhstan that is notable for its production of high quality rubber but has low vigour. Of course, the present disclosure is not limited to a particular source from where the plants are obtained.

As used herein "rubber" refers to (natural) rubber, which comprises polymers of the organic compound isoprene, in particular cis-1,4-polyisoprene. Impurities of other organic compounds may be present, such as proteins, fatty acids, resins and inorganic materials, as well as water, but preferably the rubber comprises at least 95 wt. % isoprene polymers. Impurity content may be measured by dissolving the rubber (for instance in hexane) and filtering over a 325 mesh screen. The (average) molecular weight of the polymer can be from 100,000 daltons to 1,000,000 daltons, preferably from 500,000 daltons to 1,000,000 daltons. Or the (average) molecular weight of the polymer can be more than 500,000 or more than 1,000,000 daltons. A higher molecular weight general implies higher quality of the rubber, and allows for more vigorous treatment. Forms of polyisoprene that are used as natural rubbers can be classified as elastomers. Natural rubber is used by many manufacturing companies for the production of rubber products, e.g. (car or airplane) tires.

As used herein "silage", preferably grass silage, more preferably fermented grass, can be considered as fermented, (high-moisture) stored fodder which can be fed to ruminants, i.e. cud-chewing animals such as cattle and sheep (dry feed). It is fermented and stored in a process called ensilage, ensiling or silaging, and is usually made from grass crops, including maize, sorghum or other cereals, using the entire green plant (not just the grain).

As used herein "fermentation culture" refers to a preparation to assist the fermentation process, in particular the anaerobic fermentation process of the present disclosure. The fermentation culture comprises microbiological culture(s) capable of initiating fermentation. The fermentation culture has been colonized by microorganisms, such as bacterial and fungal strains. In a preferred embodiment of the disclosure, the fermentation culture comprises bacteria from the genus *Clostridium*. Typically, a fermentation culture according to the disclosure is derived from herbivore dung, for instance cow dung. Preferably, the fermentation culture is used in, or derived from, previous fermentation steps with plant material as input material, preferably grass, more preferably plant roots, most preferably *Taraxacum* roots. As used herein "cow dung", also known as cow pats, cow pies or cow manure, is the waste product of bovine animal species. These species include domestic cattle ("cows"), bison ("buffalo"), yak, and water buffalo. Cow dung is the undigested residue of plant matter which has passed through the animal's gut. The resultant fecal matter is rich in minerals. The term herbivore dung thus refers to dung derived from a herbivore, which can be a cow. The fermentation culture may typically comprise three populations of bacteria: 1) starter population; 2) main consumption energy sources population; and 3) population consuming the more difficult digestables (as compared to main energy sources), for example lignin.

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one". It is further understood that, when referring to "sequences" herein, generally the actual physical molecules with a certain sequence of subunits (e.g. amino acids) are referred to.

Methods of carrying out the conventional techniques used in methods of the present invention will be evident to the skilled worker, and are disclosed for example in Modern Solid State Fermentation, Theory and Practice (ed. Hongzhang Chen; Springer Science+Business Media Dordrecht, 2013; and Current Developments in Solid State Fermentation (ed. Ashok Pandey, Carlos Ricardo Soccol, Christian Larroche; Springer Science+Business Media, 2008).

DESCRIPTION OF THE INVENTION

The present disclosure relates to a method of recovering rubber from plants using dry fermentation with or without a pre and/or post treatment of the material. The final rubber product is of a higher quality in comparison to existing methods.

Preferably, the method according to the disclosure makes use of a substantially non-mechanical method: dry fermentation anaerobic digestion preferably using percolation, and preferably combined with limited pre- or post-treatments. The method may take no more than e.g. 2, 3, 4, or 5 weeks from harvest to the final rubber product.

As compared to the many prior art methods, the present method is less time-consuming and less energy-consuming, and leads to an end product that is of a high quality.

Importantly, the method requires little to no addition of water and thus has little environmental effect. Moreover, biogas can be obtained directly throughout the fermentation.

Further, the remainder of the fermented biomass (digestate) as well as the percolate (fermentation culture) can be re-used either in the method of the present disclosure or for fertilizing agricultural fields, and therefore the nutrient cycles can be closed.

The present method can combine dry fermentation to digest plant material with coagulation of the rubber. The present method is simple and therefore much less expensive, and does not require complex factory process steps, e.g. mechanically invasive steps, as compared to other methods.

Further, the method does not require mechanical steps to remove the majority of plant material, and obviating these steps greatly improves the rubber quality as achieved by the method.

More specifically, the present disclosure provides a method for obtaining rubber from rubber-containing plant material, the method comprising the steps of:

a) subjecting a composition comprising rubber-containing plant material and a fermentation culture to conditions allowing fermentation, preferably anaerobic fermentation, more preferably anaerobic dry fermentation, wherein the fermentation, or specifically step a) or the method as a whole, preferably does not comprise or involve mixing or movement of the rubber-containing plant material (or parts thereof), wherein the fermentation, or step a) or the method as a whole, is performed in the absence of oxygen ventilation and/or wherein the fermentation culture is cycled through the composition, e.g. by percolation, preferably wherein the composition has a water content of less than 95 wt. %, preferably at most 90 wt. % with respect to the (fresh) weight of the composition;

b) obtaining rubber from the composition.

In step a), the rubber-containing plant material can be combined with a fermentation culture to form a composition, denominated herein further as the composition as a whole. Typically, the rubber-containing plant material, or the composition as a whole, has a rubber content of between 0.1 and 20 wt. %, preferably between 0.5 and 15 wt. %, or between 1 and 10 wt. %, or between 2 and 7 wt. %, with respect to total weight of the plant material or the composition. The method, and thus step a) also works very well when the composition or the plant material has a low rubber content, e.g. at most 5, 4, 3, 2, or at most 1 wt. % with respect to the weight of the composition or plant material.

Preferably, step a) does not involve stirring or mixing of the composition, which has the advantage that the rubber does not stick/adhere to the moving parts.

In a preferred embodiment, the fermentation culture is actively added, which may result for example in a composition comprising at least 70, 75, 80, 85, 90, or 95 wt. % plant material and/or comprising at least 1, 2, 3, 4, 5, 10, 15, 20, 25, or 30 wt. % fermentation culture. It may also result for example in a composition comprising at most 1, 2, 3, 4, 5, 10, 15, 20, 25, or 30 wt. % fermentation culture. It is also possible to add additional liquid like water to the composition, as long as the resulting composition has a water content of preferably at most 90 wt. %. More preferably, the composition as a whole, or the plant material on its own, has a water content of less than, or at most, 95 wt. %, 90 wt. %, 85 wt. %, preferably at most 80 wt. %, or at most 75 wt. %.

Instead of allowing the composition to have a water content of less than, or at most, 95 wt. %, or 90 wt. %, it is an alternative to start with a certain weight of plant material, and add not more than the same weight in water/fermentation culture, preferably not more than 90, 80, 70, 60, 50, 40, 30, 20, 10, 5% of the weight of the plant material. This also results in a composition suitable for subjecting to conditions allowing anaerobic dry fermentation.

Conditions allowing anaerobic fermentation means that anaerobic digestion of the plant material can be achieved. Preferably, the conditions allowing anaerobic (dry) fermentation are such that no air and/or gas mixture containing more than 15 vol. % oxygen, preferably no air containing more than 10, 5, 4, 3, 2, 1, or 0.1 vol. % oxygen is present in step a). In particular, the outside, or outer surface, of the composition is in contact with no air containing more than 15 vol. % oxygen, preferably no air containing more than 10, 5, 4, 3, 2, 1, or 0.1 vol. % oxygen. Additionally or alternatively, the conditions allowing anaerobic fermentation are such that step a) is performed in the absence of oxygen ventilation, e.g. by applying a one direction valve, for example only letting gas out which may be collected.

The skilled person is familiar with performing anaerobic (dry) fermentation, as is evident from for example in Modern Solid State Fermentation, Theory and Practice (ed. Hongzhang Chen; Springer Science+Business Media Dordrecht, 2013; and Current Developments in Solid State Fermentation (ed. Ashok Pandey, Carlos Ricardo Soccol, Christian Larroche; Springer Science+Business Media, 2008). In practice, a suitable fermenter can accordingly be selected wherein the fermentation can be carried out. Typically, the anaerobic digestion is carried out by microorganisms that can only live or thrive in an anaerobic (oxygen free) environment. Further, it will be clear to the skilled person that the decomposition of the input plant material can occur in four stages: (1) hydrolysis, (2) acidogenesis (with as intermeditates e.g. propionic acid, butyric acid), (3) acetogenesis (with as products e.g. acetic acid, hydrogen), and (4) methanogenesis (with as product i.a. methane). Preferably, the input rubber-containing plant material does not comprise wood. Wood, although biodegradable, has a high lignin content which may slow down the hydrolysis phase. However, wood may nonetheless be used as, or as part of, the rubber-containing plant material as used as input for the fermentation.

Step a) may be performed within a fermentor. In a preferred embodiment, the method is worked in a transportable container/fermentor. This allows processing of plant material on the production spot where the plants are grown, and avoids transportation of all plant material to a processing facility. Thus, only the (nearly purified) rubber end-product has to be transported from the production spot.

In another preferred embodiment of the method, entire plants are subjected to the method of the disclosure. This has as advantage that further processing of the plants, such as dividing the above-ground part of the plant from the root part, is not necessary, and that the above-ground material, in particular the leaf material, adds substantially in the generation of useful biogas.

Alternatively, the method according to the present disclosure can be applied with rubber-containing plant material or the composition as a whole that comprises at least 25, 30, 35, 40, 45, 50, 55, 60, 65, 70, or 75 wt. % plant root material, more preferably at least 80, 90, or 95, wt. % plant root material with respect to the weight of the plant material, or the composition as a whole. It was found that the present method works specifically well when using root material.

In a particularly preferred embodiment, the method according to the present disclosure is applied with rubber-containing plant material from the genus *Taraxacum*, preferably from one or more of *Taraxacum koksaghyz*, *Taraxacum bicorne* and/or *Taraxacum brevicorniculatum*, or hybrids thereof, or from one or more of *Lactuca serriola* and/or *Lactuca sativa*, or hybrids thereof. Alternatively, the present disclosure is applied with rubber-containing plant material from the genus *Scorzonera*, particularly *Scorzonera hispanica*, *Scorzonera tausaghyz* or hybrids thereof. In view of the above, it is clear that the present disclosure can be applied with rubber-containing plant material from the family Asteracea or subspecies thereof, or hybrids thereof. It can be found that the method also works surprisingly well with any of these specific plants. Further, the method works fine if the plant material, or the composition as a whole, comprises weeds, e.g. non-crop plants.

Alternatively or additionally, it is an option that the plant material is
- boiled, or heated, at a temperature of at least 60, 70, 80, 90, or 95 degrees Celsius, preferably for 1-60 seconds, at least 10, 20, 30 seconds, and/or at most 1, 2, or 5 minutes,
- minced,
- cut in pieces, e.g. having an average diameter of 1-70, 1-50, 10-50, 20-40, 1-10 or 2-8 mm, and/or
- macerated, such as by mashing, e.g. with a hammer, before the anaerobic fermentation of step a) and/or after the anaerobic fermentation of step a). This can result in a more efficient and effective fermentation process, requiring e.g. a shorter time period for step a), and/or higher rubber quality. Particularly, this additional step may lead to less ashes, a quicker process, less contamination and a purer end result. In the case of boiling, it may give the possibility to obtain inulin from the raw product prior to the fermentation.

Preferably, the boiling or heating treatment at a temperature of at least 60, 70, 80, 90, 95, 99 or 100 degrees Celsius, preferably for 1-60 seconds, at least 10, 20, 30 seconds, and/or at most 1, 2, or 5 minutes, is combined with, or subsequent to, the cut in pieces treatment, e.g. wherein the pieces have an average diameter of 1-70, 1-50, 10-50, 20-40, 1-10 or 2-8 mm, in order to obtain both high yield and high rubber quality, while at the same time having the possibility to obtain inulin from the raw product prior to the fermentation.

Step a) can be performed for 1-60 days, preferably 3-40 days, more preferably 6-30 days, even more preferably 10-20 days. Preferably, step a) is performed for at most (about) 21 days, for example 16, 17, 18, 19, 20, 21, 22, 23, or 24 days. It was found that already within this period, high quality rubber can be easily obtained. Preferably, step a) is performed at 20-degrees Celsius, or 25-40, more preferably at 30-42 or 36-40, most preferably 38 degrees Celsius.

The method according to the disclosure, in particular step a), can be batch-operated. One batch can be seen as performing steps a) and/or b) of the method according to the disclosure. Preferably, a subsequent batch starts with fresh and unfermented rubber-containing plant material, although the fermentation culture of the previous batch may be re-used, i.e. added to the composition as a whole as processed in said subsequent batch.

Silage might be added to the composition, particularly to start the process, especially for the first 1, 2, 3, 5, or 10 batches, such that the composition in step a) further comprises silage, preferably grass silage. This may foster the fermentation process, such that the time period for step a) can be reduced. Later batches likely benefit from a better adapted fermentation culture, thus typically do not need addition of silage.

The fermentation culture used in step a) is preferably derived from herbivore dung, preferably cow dung or elephant dung, and preferably is capable of digesting plant material. It was found that particularly these sources provide very effective fermentation cultures for the purpose of the present method.

The fermentation cultures for use in step a) of the method of the invention may also be a fermentation culture optimized for silage fermentation. Such fermentation cultures are publicly available and can be purchased for instance at Chr. Hansen Animal Health & Nutrition (WI, USA) (e.g. Biomax®). A silage inoculant contains live bacteria, preferably at least 100,000 Colony Forming Units/g (CFU/g) of the composition as a whole. The fermentation culture preferably comprises bacteria from the genus *Clostridium*. In subsequent batch(es), the fermentation culture can be derived from previous batch(es). In this way, generally, the fermentation culture will more and more adapt to the plant material to be fermented, which makes the process more and more efficient. Making the fermentation more efficient can also be achieved by preheating the plant material or the composition before step a).

In a preferred embodiment of step a), the fermentation culture is cycled through the composition, such as by percolation. This can be done under closed-loop liquid cycle conditions, meaning that the liquid being the fermentation culture may be cycled through the composition, such as by introducing the fermentation culture on top of the composition, and allowing it to percolate through the composition, collecting it at the bottom, and introducing the fermentation culture again on top of the composition, and repeating this process. Percolation can thus be seen as a process of allowing liquid (such as comprising the fermentation culture) to pass through a (relatively porous and/or relatively solid) substance, such as the composition, particularly the plant material. This embodiment has the distinct advantage that the contact between the plant material and the fermentation culture is improved, i.e. it is ascertained that the majority or all of the plant material is adequately digested.

As a further preference, the method comprises the recovery of biogas. In this embodiment, biogas, e.g. comprising methane and/or carbon dioxide, is produced in step a), under conditions suitable therefore. Furthermore, preferably conditions are in place for collection of the biogas.

In step b) of the method, rubber is obtained from the composition. Typically, the rubber will coagulate from the digested plant tissue and can be easily obtained. The product obtained after step a) may comprise digested plant material (e.g. xylem material, root epidermal material), and coagulated rubber. The coagulated rubber can thus be separated (isolated) from these other materials. Pressing and/or milling and/or sieving of the product obtained after step a) is preferred to further coagulate and/or separate the rubber.

In a preferred embodiment, the composition obtained after step a) is enzymatically treated using hemi-cellulase, pectinase, B-glucanase, and/or cellulase. It was surprisingly found that this enzymatic treatment drastically improved the quality of the rubber obtained by the method of the present disclosure (e.g. isoprene polymers with higher molecular weight). The enzymatic treatment is preferably applied for 1-24, 2-18, 3-12, 4-10, or 6-8 hours.

It is also possible to treat the composition, or exclusively the plant material, by using cellulase, pectinase, and/or a macerase enzyme composition already before or during step a). Also here, the enzymatic treatment is preferably applied for 1-24, 2-18, 3-12, 4-10, or 6-8 hours.

Additionally and/or alternative to the enzymatic treatment described above, the composition obtained after step a) can be chemically treated by e.g. adding at least one (organic) acid, preferably formic acid or acetic acid (e.g. for 1-24, 2-18, 3-12, 4-10, or 6-8 hours). It is also an option to perform this chemical treatment before and/or during step a), for example exclusively on the plant material.

The present disclosure also relates to the rubber that is obtainable by the present method. It was found that this rubber, in comparison to rubber obtained by other methods, has a higher quality (e.g. having isoprene polymers of higher molecular weight) and/or different/lower impurity content. (Isolated) rubber is provided that preferably comprises at least 85, 90, 91, 92, 93, 94, 95, 96, 97, 98, 99 wt. % isoprene polymers (with respect to the total weight of the rubber), and additionally or alternatively wherein the isoprene polymers have an (average) molecular weight of at least 1,000,000 daltons, preferably at least 1,100,000 or 1,200,000 or 1,300,000 or 1,400,000 or even at least 1,500,000 or 1,600,000 daltons, or between 1,000,000 and 1,500,000 daltons, or between 900,000 and 1,400,000 daltons, or at most 1,600,000 daltons. A higher molecular weight general implies higher quality of the rubber, and allows for more vigorous treatment. The rubber according to the present disclosure may also comprise (DNA) traces of bacteria of the genus *Clostridium*, preferably wherein the DNA comprises at least 15, 20, 25, 30 consecutive nucleotides as present (only) in bacteria of the genus *Clostridium*. For example, the method for detection of (Cluster III) *Clostridium* as described in Van Dyke and McCarthy (2002, Appl. Environ. Microbiol. vol. 68 no. 4 2049-2053) can be used for this. Briefly, DNA can be extracted from the rubber composition, and PCR amplification can be applied with (Cluster III) *Clostridium* primers (e.g. with primer sequence CARGRGATGTCAAGYCYAGGT and TCTTGAGTGYYGGAGAGGAAAGC). Alternatively, the method for detection of (Cluster I and II) *Clostridium* as described in Hung et al (2008 International Journal of Hydrogen Energy, 33: 1586-1592) can be used, in particular the *Clostridium*-specific PCR primers as described therein (e.g. with primer sequence AAAGGRAGATTAATACCGCATAA and TTCTTCCTAATCTCTACGCA).

Additionally, alternatively or more specifically, the rubber can be characterized by

- an Mn of at least 300,000, 400,000, 500,000 dalton, preferably at least 510,000, 520,000, 530,000, 540,000, 550,000, 560,000, 570,000, 580,000, 590,000, 600,000, 700,000 or 800,000, 900,000 or even at least 1,000,000 dalton;
- an Mw of at least 700,000, 800,000, 900,000, preferably at least 910,000, 920,000, 930,000, 940,000, 950,000, 960,000, 970,000, 980,000, 990,000, 1,000,000, 1,100,000 or 1,200,000, 1,300,000 or even 1,400,000, or 1,500,000 or 1,600,000 or at least 1,700,000 dalton
- an Mz of at least 1,000,000, 1,100,000 or 1,200,000, 1,300,000 or even at least 1,400,000, or 1,500,000 or 1,600,000 or 1,700,000 dalton, 1,800,000, 1,900,000, or even at least 2,000,000, 2,100,000, 2,200,000, 2,300,000, 2,400,000, 2,500,000, 2,600,000, 2,700,000, 2,800,000, 2,900,000, or even 3,000,000, 3,100,000, 3,200,000, 3,300,000, 3,400,000, 3,500,000, 3,600,000, 3,700,000, 3,800,000, 3,900,000, or even 4,000,000 dalton; and/or
- a polydispersity of at most 10.0, 9.0, 8.0, 7.0, 6.0, 5.0, 4.0, 3.9, 3.8, 3.7, 3.6, 3.5, 3.4, 3.3, 3.2, 3.1, 3.0, 2.9, 2.8, 2.7, 2.6, 2.5, 2.4, 2.3, 2.2, 2.1, or 2.0.

Mn means the number-average molecular weight, Mw is the weight-average molecular weight, and Mz is the Z-average molecular weight. Polydispersity is the ratio Mw/Mn.

Additionally or alternatively, the rubber can be characterized by

- an Mn of at most 500,000 dalton, at most 510,000, 520,000, 530,000, 540,000, 550,000, 560,000, 570,000, 580,000, 590,000, 600,000, 700,000 or 800,000, 900,000 or even at most 1,000,000, 1,100,000, 1,200,000, 1,300,000, 1,400,000, 1,500,000, 1,600,000, 1,700,000, 1,800,000, 1,900,000 or at most 2,000,000 dalton;
- an Mw of at most 950,000, 960,000, 970,000, 980,000, 990,000, 1,000,000, 1,100,000 or 1,200,000, 1,300,000 or even at most 1,400,000, or 1,500,000 or 1,600,000 or 1,700,000, 1,800,000, 1,900,000, 2,000,000, or at most 2,500,000 dalton;
- an Mz of at most 1,000,000, 1,100,000 or 1,200,000, 1,300,000 or even 1,400,000, or at most 1,500,000 or 1,600,000 or 1,700,000 dalton, 1,800,000, 1,900,000, or even at most 2,000,000, 2,100,000, 2,200,000, 2,300,000, 2,400,000, 2,500,000, 2,600,000, 2,700,000, 2,800,000, 2,900,000, or even 3,000,000, 3,100,000, 3,200,000, 3,300,000, 3,400,000, 3,500,000, 3,600,000, 3,700,000, 3,800,000, 3,900,000, or even 4,000,000, 4,1000,000, 4,200,000, 4,300,000, 4,400,000, 4,500,000, 4,600,000, 4,700,000, 4,8000,000, 4,900,000, 5,000,000 dalton; and/or
- a polydispersity of at least 10.0, 9.0, 8.0, 7.0, 6.0, 5.0, 4.0, 3.0, 2.7, 2.6, 2.5, 2.4, 2.3, 2.2, 2.1, or 2.0, 1.9, 1.8, 1.7, 1.6, 1.5, 1.4, 1.3, 1.2, or 1.1 or at least 1.0.

Mn can be correlative with polymer colligative properties, e.g. freezing point depression. Mw may be correlated with properties such as melt viscosity. Mz may be correlated with properties such as toughness. Polydispersity characterizes the shape of the distribution: as the distribution decreases, the strength and toughness of the polymer generally increases.

Further explanation on Mn, Mw, Mz, polydispersity, and how they can be measured can be found for example in Chapter 17 "POLYMER MOLECULAR WEIGHT MEASUREMENT" of the Handbook of Polymer Synthesis, Characterization, and Processing, First Edition. Edited by Enrique Saldivar-Guerra and Eduardo Vivaldo-Lima. © 2013 John Wiley & Sons, Inc. Published 2013 by John Wiley & Sons, Inc. Preferably, the method as described in the Example is used for determining rubber quality and the above parameters. Briefly, gel permeation chromatography (GPC, also known as size exclusion chromatography, SEC) is a well-known technique for assessing the molecular weight distribution of polymers such as rubber, a property that influences many of their physical characteristics. In general, increasing molecular weight leads to higher performance, while an increase in the width of the distribution (the polydispersity) leads to a loss of performance but an increase in the ease of processing. The analysis of natural elastomers can be executed by the use of GPC using a standard Agilent system. Agilent Technologies, Inc. produces GPC columns, standards and instruments that are ideally suited to the analysis of synthetic and natural rubber. GPC/SEC-determines average molecular weights and Mp (peak molecular weight). SEC is a technique that measures Mn, Mw, and Mz at the same time by measuring the entire distribution of the polymer.

The method according to the present disclosure may lead to a higher rubber yield, in comparison to prior art rubber extraction methods. In other words, a higher percentage of the rubber in the rubber-containing plant material can be successfully obtained, i.e. isolated. In particular, the present method may lead to a higher yield of high quality rubber.

Also foreseen is a product comprising the rubber as can be obtained by the present method, for example a car tire or an airplane tire.

In view of the above, the present disclosure describes an anaerobic fermentation process, wherein the substrate of the process is a composition comprising rubber-containing plant material and a fermentation culture and the composition has a water content of less than 95 or 90 wt. %.

EXAMPLE 45 netted bags containing roots of *Taraxacum koksaghyz* (TKS) were fermented using a dry fermenter. The 45 netted bags (allowing passage of fermentation culture) were filled with recently harvested roots that were:
1) untreated;
2) mechanically macerated by using a hammer;
3) boiled in water;
4) cut in small pieces (~2-8 mm); or
5) cut in large pieces (~2-4 cm).

For each treatment nine bags were prepared with approximately 275 gram root material. The fermenter was filled with the bags, grass silage, and a fermentation culture (obtained from cow dung used in earlier fermentation steps using only grass silage). The silage and the fermentation culture was added between the bags.

Of the 45 bags:
15 bags (3 per treatment) were taken out of the fermenter after 2 weeks;
15 bags (3 per treatment) after 3 weeks; and
15 bags (3 per treatment) after one month.

The fermentation was carried out by using a dry anaerobic digestor (custom built machine by SE4SE Bioengineering BV in 2011) with the following specifications:
660 liter volume
Automated Programmable Logic Controller (PLC) system for measuring temperature, pH, gas production, and liquid flow.

The fermentation was performed under 38 degrees Celsius (i.e. conditions optimal for mesophilic bacteria), and by using percolation to cycle the fermentation culture through the root material.

The product obtained after the fermentation comprised of coagulated rubber, xylem material and root epidermal material. Limited ball milling caused further coagulation of the rubber with limited contamination of biological matter, mainly by the remainder of the root epidermal tissue.

Determining Rubber Quality (Collins-Silva J, et al. 2012, *Phytochemistry*, 79:46-56) For HPLC analyses, root extracts were resuspended in THF 2 ml overnight at RT. The root extracts were then analyzed by HPLC-GPC. The apparatus used for these analyses consisted of an HP 1100 HPLC (Agilent Technologies, Palo Alto, Calif.), one Phenogel 50×7.80 mm guard column and two Phenogel 10 I Linear columns (300×7.80 mm) (Phenomenex, Torrance, Calif.) connected in series, and a Sedex Model 75 Evaporative Light Scattering Detector (SEDERE, France). The samples were fractionated using an isocratic elution in toluene at 70° C. with a flow rate of 1 ml/minute. Chromatograms were generated and analyzed using ChemStation for LC Rev. A. 10.02 (1757) software (Agilent Technologies). Rubber polymer molecular weight was calculated from HPLC-GPC data using the Agilent GPC Data Analysis ChemStation Module (version B.01.01). Calibration curves for molecular weight analyses were generated from polystyrene standards (Polymer Laboratories, UK) with Mps (peak molecular weights) ranging from 1480 to 3114,000 daltons. Rubber was quantified by calculating rubber mass as a function of peak area using a standard curve generated from serial dilutions of known amounts of a synthetic polyisoprene (Kraton Polymers IR-401, Houston, Tex.). For each experiment, root extracts, molecular weight standards and mass quantification standards were analyzed in the same run to decrease variability.

The Table below shows the Mn, Mw, Mz, and polydispersity values as obtained for each treatment.

TABLE 1

| | Mn (g/mole) | Mw (g/mole) | Mz (g/mole) | Polydispersity (Mw/Mn) |
|---|---|---|---|---|
| Untreated | 700670 | 1663480 | 2961500 | 2.49 |
| Mechanically macerated by using a hammer (mashed with a wooden hammer) | 594460 | 1283467 | 2427383 | 2.17 |
| Boiled in water (cut in large pieces (2-4 cm) + heat shock 30 seconds at 95° C.) | 669835 | 1568500 | 3053550 | 2.35 |
| Cut in large pieces (2-4 cm) | 545010 | 1247700 | 2430040 | 2.31 |
| Cut in small pieces (2-8 mm) | 590347 | 1263873 | 2368200 | 2.15 |
| Control rubber sample obtained from dandelion roots by prior art method (Eskew, Rubber Chemistry and Technology 19(3), 856-864, 1946) | 366840 | 880190 | 1730650 | 2.40 |

Post processing of the material using a chemical treatment, i.e. adding formic acid or enzymatic treatment (6-8 hours) using cellulase/pectinase/hemi-cellulase/B-glucanase (plant extract enzyme containing B-glucanase >2600000 u/ml; cellulose >200000 u/ml; hemi-cellulase >2600000 u/ml; and pectinase >5000 u/ml obtained from Alibaba) further improved the quality of the rubber and using limited ball milling (2-4 hours) led to clean coagulated rubber.

Treatments of fresh roots with only enzymes or only organic (formic) acid, i.e. without dry fermentation did not result in coagulated rubber.

Special acknowledgement is expressed to Michiel T. Klaassen and Johanna M. van Leeuwen from CAH Vilentum University of Applied Sciences (Sustainable energy and green resources) for carrying out the fermentation and for operating the fermentor.

The invention claimed is:

1. A method for obtaining rubber from rubber-containing plant material, the method comprising the steps of:
   (a) subjecting a composition comprising rubber-containing plant material and a fermentation culture to conditions allowing anaerobic fermentation, wherein the composition has a water content of at most 85 wt. %, wherein the plant material comprises at least 75 wt. % plant root material, and wherein the fermentation culture is cycled through the rubber-containing plant material by percolation, and wherein the fermentation is performed in the absence of oxygen ventilation; and
   (b) obtaining rubber from the composition.

2. The method according to claim 1, wherein in step a) the conditions allowing anaerobic fermentation are such that no air and/or gas mixture containing more than 15 vol. % oxygen is present.

3. The method according to claim 1, wherein in step a) the conditions allowing anaerobic fermentation are achieved by replacing oxygen by another gas.

4. The method according to claim 1, wherein in step a), the anaerobic fermentation does not comprise mixing or movement of the rubber containing plant material or parts thereof.

5. The method according to claim 1, wherein the composition in step a) further comprises silage.

6. The method according to claim 1, wherein the rubber-containing plant material is from the genus *Taraxacum*.

7. The method according to claim 1, wherein the rubber-containing plant material is from one or more of *Lactuca serriola* and/or *Lactuca sativa* or hybrids thereof, or wherein the rubber-containing plant material is from *Scorzonera*, or wherein the rubber-containing plant material is from family Asteracea.

8. The method according to claim 1, wherein the method is batch-operated.

9. The method according to claim 1, wherein the anaerobic fermentation in step a) is anaerobic dry fermentation.

10. The method according to claim 1, wherein step a) is performed for 1-60 days.

11. The method according to claim 1, wherein the fermentation culture is derived from herbivore dung.

12. The method according to claim 1, wherein the fermentation culture comprises bacteria from the genus *Clostridium*.

13. The method according to claim 1, wherein the method comprises the recovery of biogas.

14. The method according to claim 1, wherein the plant material is boiled, minced, cut in pieces and/or macerated before and/or after the anaerobic fermentation.

15. The method according to claim 1, wherein the plant material is enzymatically treated by adding cellulase, pectinase, and/or hemi-cellulase before and/or after anaerobic fermentation.

16. The method according to claim 1, wherein the plant material is chemically treated by adding organic acid before and/or after the anaerobic fermentation.

17. The method of claim 1, wherein the composition has a water content of at most 80 wt. %.

* * * * *